United States Patent
Bock

(10) Patent No.: US 9,681,673 B1
(45) Date of Patent: Jun. 20, 2017

(54) BOLT TOOL SYSTEM HAVING AUTOMATIC LOCK PIN FOR ACTIVATOR

(71) Applicant: Bock Industries, Inc., Phillipsburg, PA (US)

(72) Inventor: Randall Bock, Phillipsburg, PA (US)

(73) Assignee: Bock Industries, Inc., Philipsburg, PA (US)

( * ) Notice: Subject to any disclaimer, the term of this patent is extended or adjusted under 35 U.S.C. 154(b) by 0 days.

(21) Appl. No.: 15/222,321

(22) Filed: Jul. 28, 2016

(51) Int. Cl.
*A22B 3/00* (2006.01)
*A22B 3/02* (2006.01)

(52) U.S. Cl.
CPC .................................... *A22B 3/02* (2013.01)

(58) Field of Classification Search
CPC .................................. A22B 3/02; A22B 3/08
USPC ...... 452/57, 61, 62; 42/1.12, 1.14, 8, 12, 44, 42/64
See application file for complete search history.

(56) References Cited

U.S. PATENT DOCUMENTS

| | | | |
|---|---|---|---|
| 3,027,593 A | 4/1962 | Maxen | |
| 3,040,711 A | 6/1962 | Maxen | |
| 3,088,440 A | 5/1963 | Wilmer | |
| 3,632,032 A * | 1/1972 | Termet | A22B 3/02 206/3 |
| 3,727,337 A * | 4/1973 | Hancox | B25C 1/143 42/1.12 |
| 4,219,905 A | 9/1980 | Thacker et al. | |
| 4,280,248 A | 7/1981 | Herubel | |
| 4,497,377 A | 2/1985 | Haytayan | |
| 4,575,900 A | 3/1986 | Hamel et al. | |
| 4,625,442 A | 12/1986 | Hill et al. | |
| 4,757,627 A * | 7/1988 | Saligari | A22B 3/02 42/1.12 |
| 5,020,257 A | 6/1991 | Termet | |
| 5,692,951 A | 12/1997 | Huff | |
| 6,135,871 A | 10/2000 | Jones | |
| 6,250,007 B1 | 6/2001 | Payne et al. | |
| 8,821,221 B1 | 9/2014 | Bock | |
| 9,044,028 B2 | 6/2015 | Evans | |
| 2004/0209562 A1 | 10/2004 | Jones | |

FOREIGN PATENT DOCUMENTS

| | | |
|---|---|---|
| EP | 1649753 | 4/2006 |
| GB | 413044 | 7/1934 |
| GB | 846704 | 8/1960 |
| GB | 854061 | 11/1960 |
| GB | 1110603 | 4/1968 |

(Continued)

*Primary Examiner* — Richard Price, Jr.
(74) *Attorney, Agent, or Firm* — Dinsmore & Shohl LLP

(57) ABSTRACT

A bolt tool system includes a tool housing, a bolt guide, a bolt, an activator, a pin casing, and a lock pin. The bolt guide is attached to the tool housing. The bolt is moveably received within the bolt guide for movement between a retracted position and an extended position. The activator is moveably received on the bolt guide for movement between a safe position and a fire position. In the fire position, the bolt is moveable from the retracted position to the extended position. The pin casing has a passage in communication with an aperture formed in the activator. The lock pin is slidably received within the pin casing. The lock pin is moveable between a disengaged position and an engaged position in which the lock pin retains the activator in the fire position.

20 Claims, 5 Drawing Sheets

(56) References Cited

FOREIGN PATENT DOCUMENTS

| GB | 2074836 | 11/1981 |
|----|---------|---------|
| GB | 2079125 | 1/1982 |
| GB | 2032750 | 10/1982 |
| GB | 2143717 | 7/1986 |

\* cited by examiner

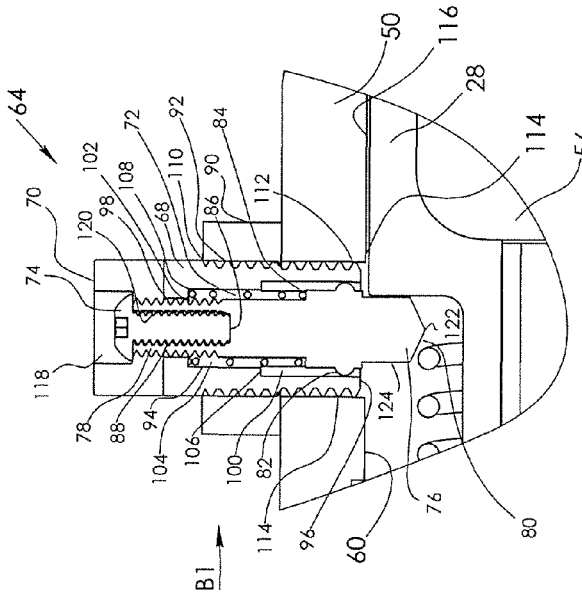
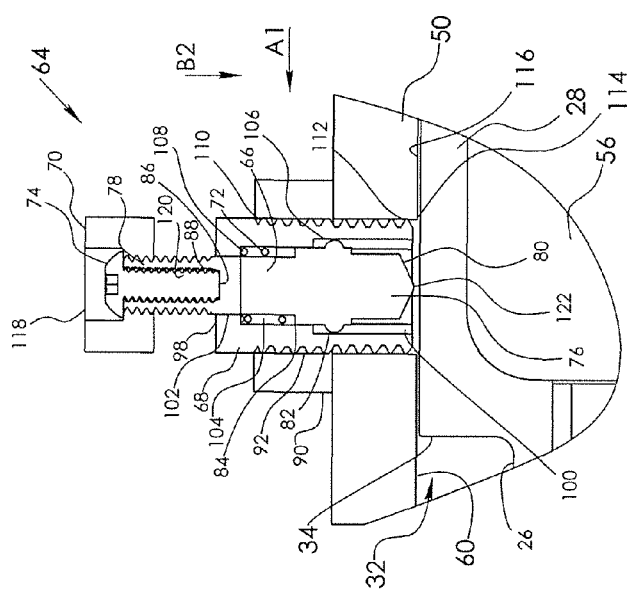
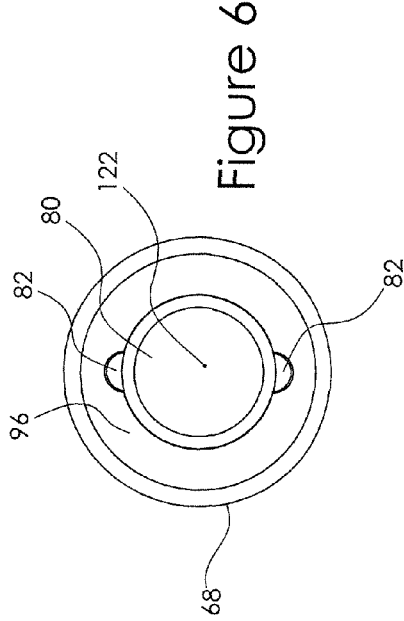

US 9,681,673 B1

BOLT TOOL SYSTEM HAVING AUTOMATIC LOCK PIN FOR ACTIVATOR

TECHNICAL FIELD

The present disclosure relates generally to a bolt tool system that is used in stunning or dispatch of livestock and, more particularly, to a bolt tool system having an automatic lock pin that locks an activator in a fire position.

BACKGROUND

Euthanasia of livestock is necessary both for livestock processing operations and for farms and other facilities where it is necessary to euthanize sick, injured or compromised animals. There has been significant effort dedicated to developing devices, methods and guidelines for the humane dispatch of livestock.

Captive bolt tools represent one category of tool for use in the euthanasia of livestock. These tools have a housing that supports a moveable bolt that is moved between a retracted and extended position using a variety of actuation mechanisms. The bolt tools are either "captive" or "non-captive". In captive bolt tool systems, the bolts are not released from the housing, and are returned to the retracted position after each operation. In non-captive bolt tool systems, the bolt is released from the tool housing, and a bolt is reloaded into the housing after each operation.

Penetrating captive bolt tools are used for stunning animals prior to processing and generally have a long cylindrical bolt that penetrates the skull of an animal to be euthanized. Non-penetrating captive bolt devices have a bolt that does not penetrate the brain of the animal and may have a wide mushroom-shaped head on the captive bolt.

Both captive bolt tools and non-captive bolt tools typically include a safety mechanism to prevent unintended movement of the bolt from the retracted position to the extended position. The safety mechanism may be known as a "contact" safety mechanism which requires contact of the captive bolt tool with the animal to be euthanized. Upon contact with the head of the animal to be euthanized, the safety mechanism is moved from a 'safe' position to a 'fire' position which allows movement of the bolt from the retracted position to the extended position or allows the firing of the bolt. However, force is often required to move the safety mechanism from the 'safe' position to the 'fire' position. The continued contact and depression of the bolt tool against the head of the animal to be euthanized often increases stress applied to the animal during the stunning process.

Thus, there exists a need in the art to provide a bolt tool system which reduces stress on the animal to be euthanized prior to movement of the bolt from the retracted position to the extended position.

SUMMARY

The present disclosure provides a bolt tool system having a lock pin that automatically locks and retains an activator in a fire position without contacting the animal to be stunned.

In brief, an example of a bolt tool system includes a tool housing, a bolt guide, a bolt, an activator, a pin casing, and a lock pin. The bolt guide is attached to the tool housing. The bolt is moveably received within the bolt guide for movement between a retracted position and an extended position. The activator is moveably received on the bolt guide between a safe position and a fire position. In the fire position, the bolt is moveable from the retracted position to the extended position. The pin casing has a passage in communication with an aperture formed in the activator. The lock pin is slidably received within the pin casing. The lock pin is moveable between a disengaged position and an engaged position in which the lock pin retains the activator in the fire position.

These and additional features provided by certain embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5A is a partial cross-sectional view of the captive bolt tool system in which the automatic lock pin is in a disengaged position;

FIG. 5B is a partial cross-sectional view of the captive bolt tool system in which the automatic lock pin is in an engaged position; and FIG. 6 is a bottom view of the automatic lock pin.

DETAILED DESCRIPTION OF THE EMBODIMENTS

Figure 1:
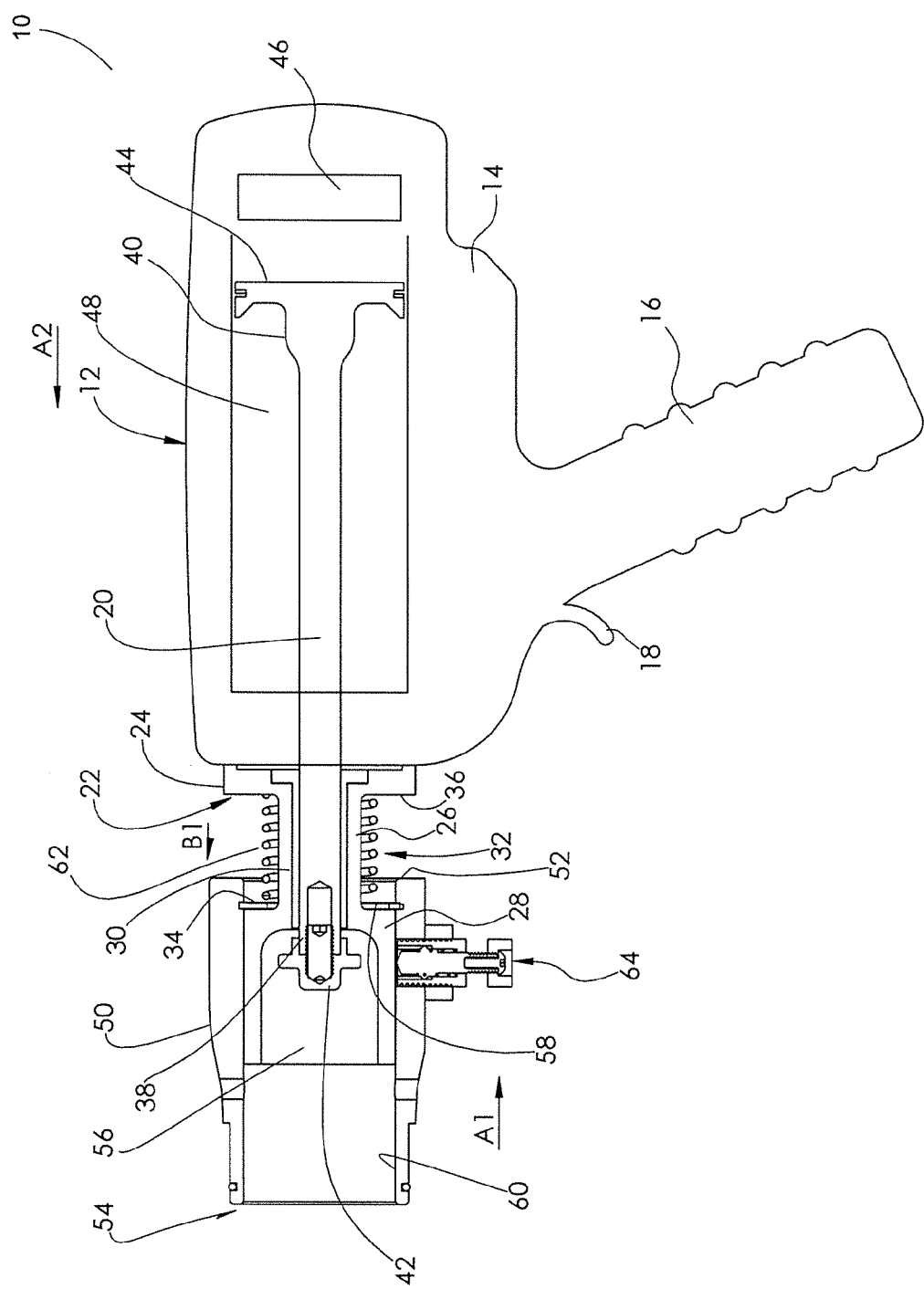
FIG. 1 is a side view in partial cross section of an embodiment of the captive tool system in a first position.

FIG. 1 generally depicts an embodiment of a captive bolt tool system having an automatic lock pin that automatically locks an activator in a fire position upon movement of the activator from the safe position to the fire position. The captive bolt tool system generally comprises a tool housing having a bolt guide attached to the tool housing. A bolt is moveably received within the bolt guide between a retracted position and an extended position. An activator is moveably received on the bolt guide between an inactive position and an active position. An automatic lock pin is at least partially received within the activator and is moveable between a disengaged position and an engaged position.

In the engaged position, the lock pin engages with the bolt guide to retain the activator in the fire position. Specifically, the lock pin is received within a recess formed in the bolt guide and prevents the activator from moving out of the fire position. In the disengaged position, the lock pin does not interfere with the movement of the activator from the fire position to the safe position or the movement of the activator from the safe position to the fire position. Specifically, the lock pin is not received within the recess formed in the bolt guide and allows the activator to move into and out of the fire position.

Embodiments disclosed herein include improvements to tool systems for use in the humane dispatch of livestock. The improvements to the tool systems are applicable to both penetrating and non-penetrating type captive bolt tool systems. In some embodiments, the improvements are used with a non-captive bolt tool system in which the bolt is released from the tool housing. In the non-captive bolt tool system, the bolt is in the retracted position prior to being released from the tool housing and the bolt is in the extended position upon being released from the tool housing due to actuation of the actuation mechanism.

The automatic lock pin automatically retains the activator in a fire position upon movement of the activator from the safe position to the fire position. As such, the only contact between the bolt tool system and the livestock to be euthanized is the bolt upon movement into the extended position. Therefore, the livestock to be euthanized does not undergo stress related to contact of the bolt tool system prior to the contact of the bolt.

Referring now to the drawings, FIG. 1 schematically depicts a captive bolt tool system generally illustrated at 10. The captive bolt tool system 10 includes a tool housing 12. In some embodiments, the captive bolt tool housing 12 has a shape similar to a power tool and includes a main body 14, a handle 16 to be gripped during use and a trigger 18 for operating the captive bolt tool system 10. The captive bolt tool system includes a moveable bolt 20 that is supported by the tool housing 12.

In some embodiments, the tool housing 12 includes a bolt guide 22 secured to the main body 14. The bolt guide 22 includes a flange portion 24, a stem portion 26, and a receiver portion 28. The bolt guide 22 is forming having a bolt passage 30 extending from one end of the bolt guide 22 to an opposite end of the bolt guide 22. Specifically, the bolt passage 30 extends through the flange portion 24, the stem portion 26, and the receiver portion 28.

The flange portion 24 is fixed to the main body 14 of the tool housing 12 such that the bolt guide 22 does not move with respect to the main body 14. The stem portion 26 is formed having an outer diameter that is less than an outer diameter of both the flange portion 24 and the receiver portion 28. The difference in the outer diameter of the stem portion 24 and the outer diameters of the flange portion 24 and the receiver portion 28 forms a recess 32 defined between a receiver shoulder 34 and a flange shoulder 36.

Figure 4:
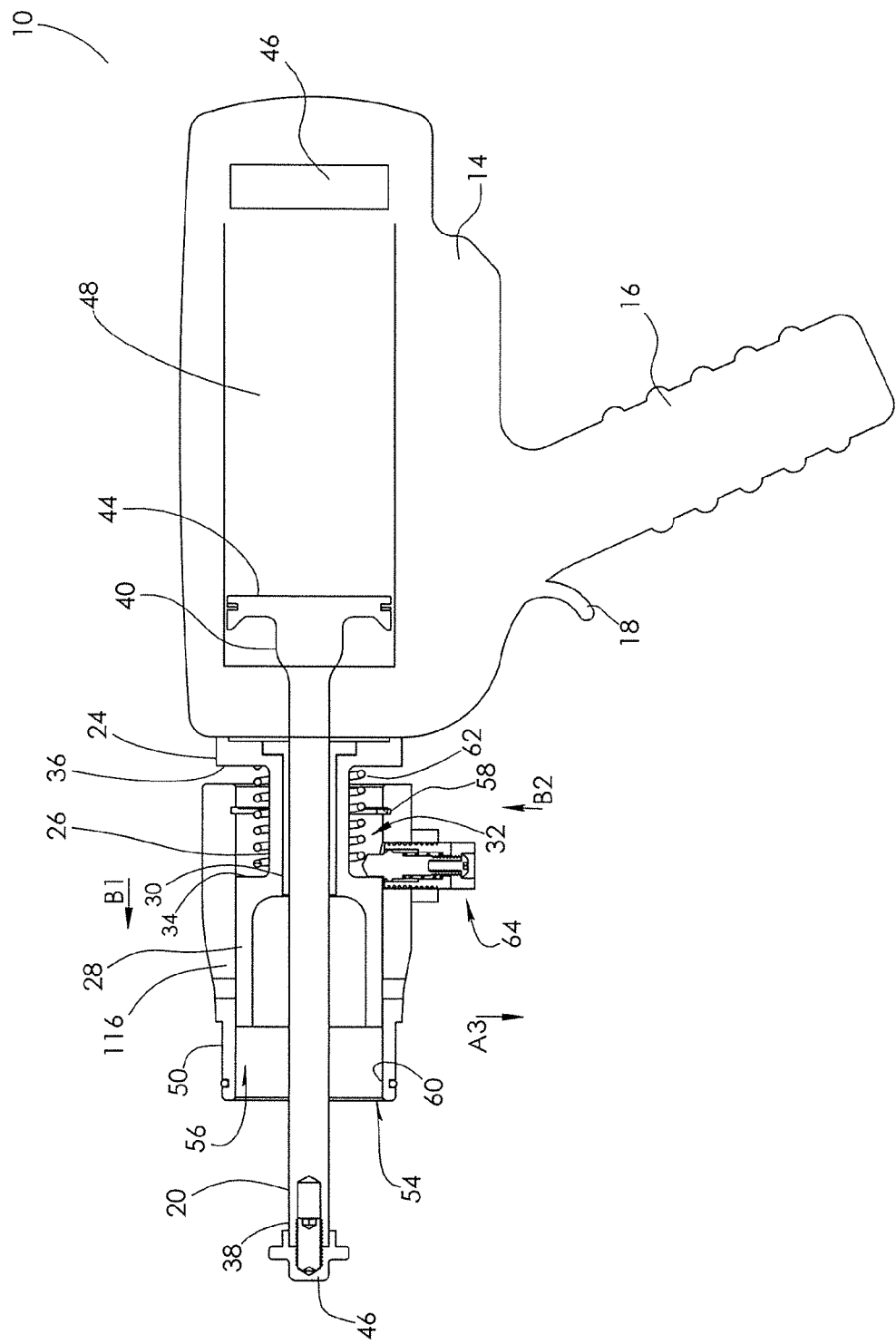
FIG. 4 is a side view in partial cross section of the captive bolt tool system in a third position.

The bolt 20 is slidably received within the bolt passage 30 of the bolt guide 22. The bolt 20 is partially received within the bolt passage 30 and partially received within the main body 14. The bolt guide 22 guides and supports the bolt 20 between its retracted position, as shown in FIG. 1, and its extended position, as shown in FIG. 4.

The bolt 20 includes an outer end 38 and an opposite inner end 40. The outer end 38 is provided outside of the main body 14 and the inner end 40 is provided inside the main body 14. Specifically, the outer end 38 is provided on the receiver portion 28 side of the bolt guide 22 and the inner end 40 is provided at the flange portion 24 side of the bolt guide 22. The outer end 38 includes an effector end 42 that contacts the head of the animal to be euthanized. Different effector ends may be used, or the end of the bolt may form the effector end. The inner end 40 includes a piston 44.

The inner end 40 and the piston 44 are in communication with an activation mechanism 46 provided within a chamber 48 in the main body 14. The activation mechanism 46 is provided with a reloadable explosive charge that is ignited to displace the piston 44 to move the bolt 20 from the retracted position to the extended position. It is appreciated, of course, that the activation mechanism is not limited to an explosive charge. Other options illustratively include, but not limited to, gas generators, electronic or mechanical actuators, solenoid valves, solenoid switches, and pneumatic or hydraulic mechanisms.

An activator 50 is moveably received on the bolt guide 22. The activator 50 is formed as a generally hollow cylindrical member having an open housing end 52 and an open working end 54. The hollow activator 50 forms a guide passage 56 that extends from the open housing end 52 to the open working end 54.

A retainer 58 extends radially inward from an interior surface 60 of the activator 50. A biasing member 62 is positioned between the retainer 58 and the flange shoulder 36 of the flange portion 24. The biasing member 62 biases the activator 50 towards a safe position as shown in FIG. 1.

In some embodiments, the biasing member 62 is formed as a coil spring. It is appreciated, of course, that the biasing member 62 is not limited to such a configuration, and illustratively includes other elastic or reliant members.

Figure 2:
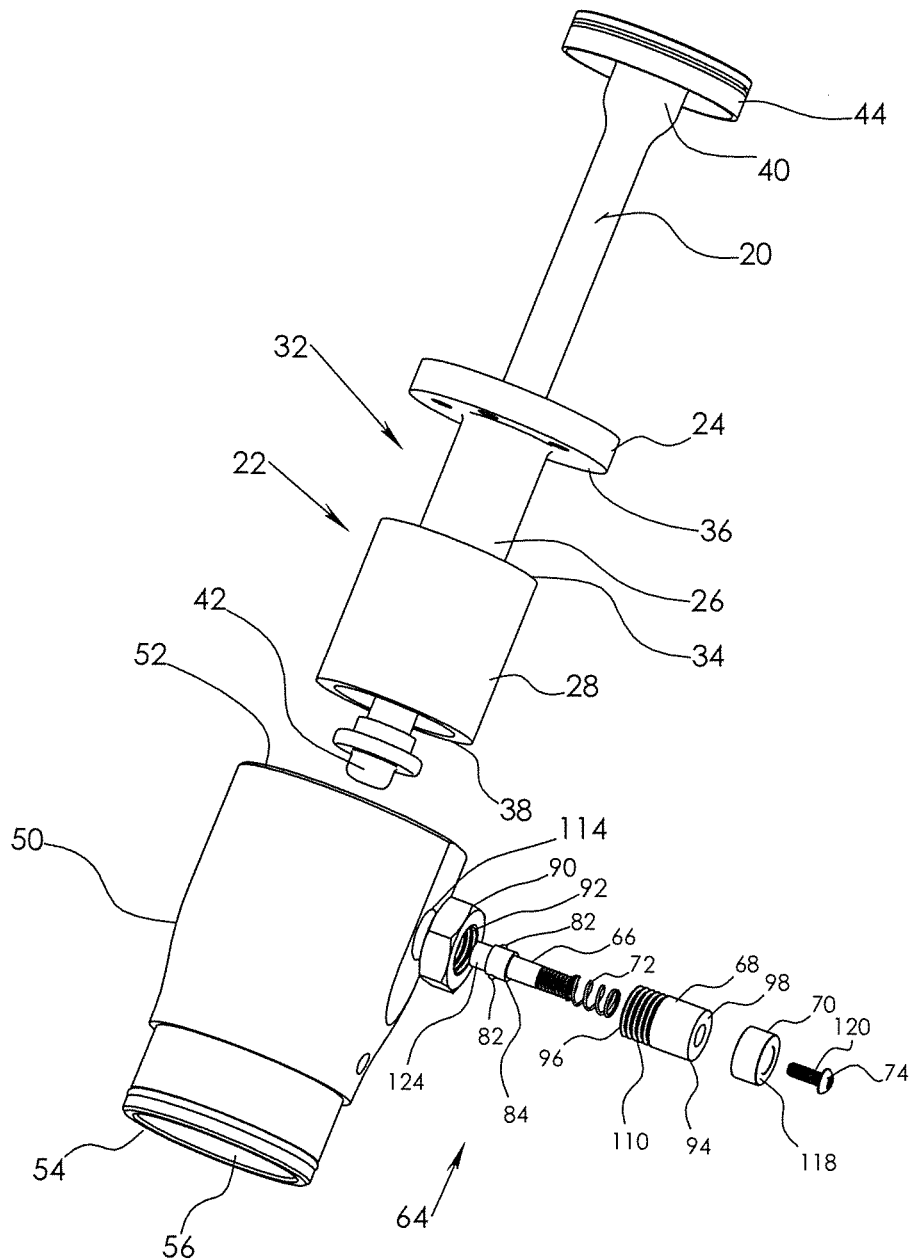
FIG. 2 is a partial exploded view of certain components of the captive bolt tool system.

With reference to FIGS. 2, 5A, and 5B, an automatic lock mechanism 64 is provided on the activator 50. The automatic lock mechanism 64 includes a lock pin 66 slidably received within a pin casing 68, a cap 70, a pin biasing member 72, and a fastener 74.

The lock pin 66 is formed having an insertion end 76 and an opposite cap end 78. The lock pin 66 is formed having a generally cylindrical shape that includes a tapered portion 80 adjacent the insertion end 76.

At least one stopper 82 protrudes radially outward from the lock pin 66 adjacent the insertion end 76. The stopper 82 is formed to have a diameter greater than a diameter of the remainder of the lock pin 66. In the illustrated embodiment, the stopper 82 is formed as a pair of opposing semispherical protrusions. It is appreciated, of course, that the stopper 82 is not limited to such a shape.

An annular collar 84 extends around the lock pin 66 between the stopper 82 and the cap end 78. An interior bore 86 is formed in the cap end 78 of the lock pin 66. The interior bore 84 is formed with interior threads 88 formed therein.

The pin casing 68 is formed as a hollow cylindrical member having a tiered passage 94 extending from an open activator end 96 to an open cap end 98. The tiered passage 94 includes a pin passage 100 disposed at the open activator end 96 of the tiered passage 94, a cap passage 102 disposed at an opposite end of the tiered passage 94, and a biasing member passage 104 positioned between the pin passage 100 and the cap passage 102.

The pin passage 100, biasing member passage 104, and cap passage 102 are in communication so as to form the tiered passage 94 that extends from the open activator end 96 to the open cap end 98. The tiered passage 94 is formed such that the pin passage 100 has a diameter larger than the diameter of the cap passage 102 and biasing member passage 104. The biasing member passage 104 is provided to have a diameter less than the pin passage 100 and greater than the cap passage 102.

An annular stopper shoulder 106 is formed at the transition between the pin passage 100 and the biasing member passage 104. An annular biasing member shoulder 108 is formed at the transition between the biasing member passage 104 and the cap passage 102.

A portion of the pin casing 68 is formed having external threads 110 adjacent the open activator end 96. The external threads 110 engage with internal threads 112 of an aperture 114 formed in the activator 50 to secure the automatic lock mechanism 64 to the activator 50, specifically, the pin casing 68 to the activator 50. In some embodiments, an internally threaded washer 90 is positioned adjacent the aperture 114 on the exterior of the activator 50 and the external threads 110 of the pin casing 68 engage with internal threads 92 of the washer 90 and the internal threads 112 of the aperture 114 to secure the automatic lock mechanism 64 to the activator 50.

Figure 3:
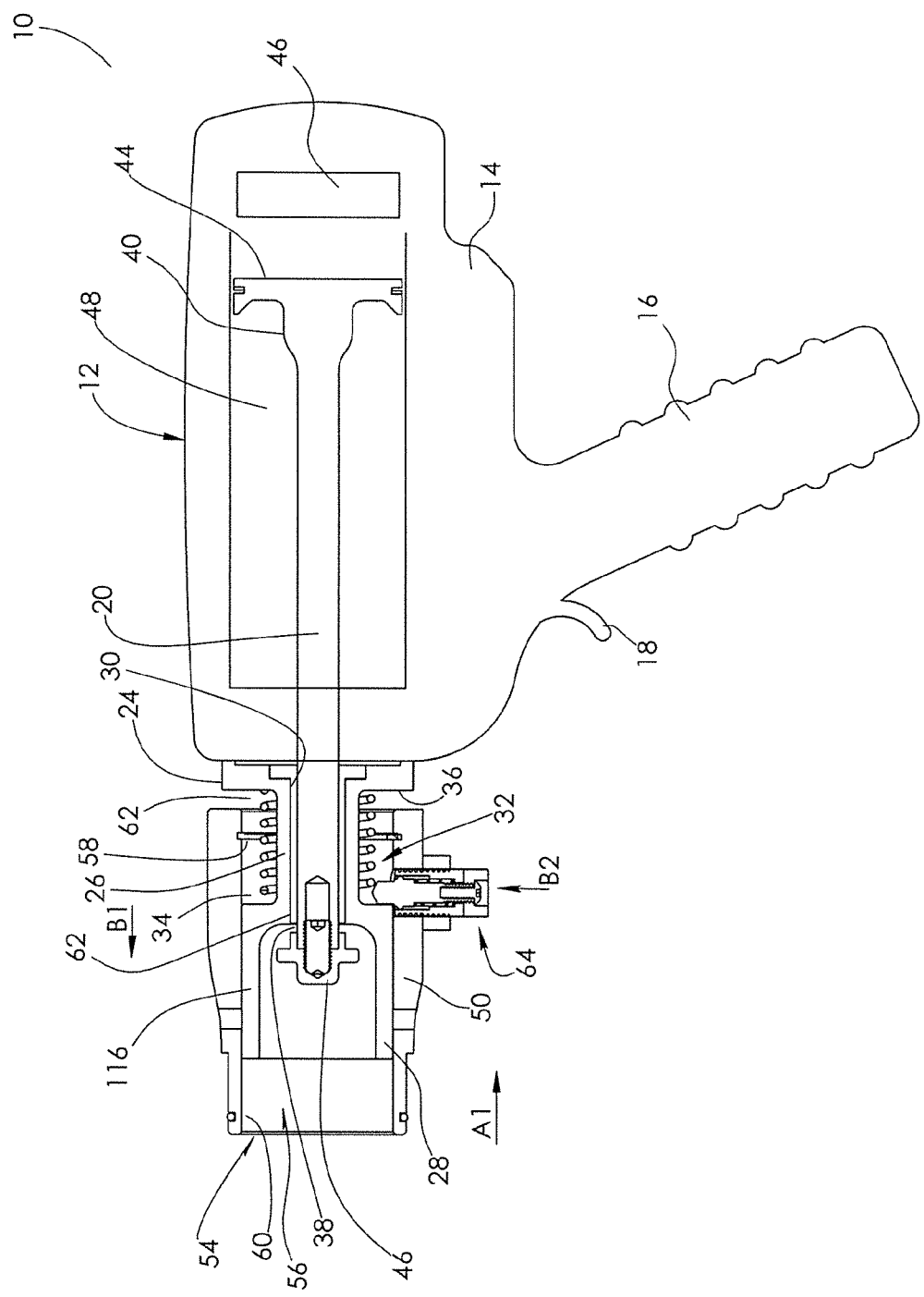
FIG. 3 is a side view in partial cross section of the captive bolt tool system in a second position.

The aperture 114 is positioned such that when the activator 50 is in the safe position, as shown in FIGS. 1 and 5A, the aperture 114 is adjacent an outer surface 116 of the receiver portion 28 of the bolt guide 22. The aperture 114 is positioned such that when the activator 50 is in the fire position, as shown in FIGS. 3, 4, and 5B, the aperture 114 is in communication with the recess 32 formed by the stem portion 26 between the receiver shoulder 34 and the flange shoulder 36.

The pin biasing member 72 is provided coaxially on the lock pin 66 with one end of the pin biasing member 72 abutting the annular collar 84 formed on the locking pin 66. The lock pin 66 and the coaxial pin biasing member 72 are inserted into the pin casing 68. Specifically, the cap end 78 of the lock pin 66 is inserted into open activator end 96 of the tiered passage 94. The lock pin 66 is received within the pin casing 68 with an opposite end of the pin biasing member 72 abutting the annular biasing member shoulder 108 formed in the tiered passage 94 of the pin casing 68.

In some embodiments, the pin biasing member 72 is formed as a coil spring. It is appreciated, of course, that the pin biasing member 72 is not limited to such a configuration, and illustratively includes other elastic or reliant members.

The cap 70 is secured to the lock pin 66 by securing the fastener 74 into the interior bore 86. Specifically, the cap 70 is formed having a cap aperture 118 through which the fastener 74 extends. The fastener 74 secures the cap 70 to the lock pin 66 due to the engagement of external threads 120 on the fastener 74 and the internal threads 88 in the bore 86 secure the lock pin 66 within the pin casing 68. As the cap 70 is provided with an outer diameter that is larger than a diameter of the cap open end 98 of the tiered passage 94, the cap 70 retains the lock pin 66 within the pin casing 68. In some embodiments, a portion of the lock pin 66 adjacent the cap end 78 is provided with external threads that engaged with internal threads formed in the cap aperture 118.

Upon the fastener 74 securing the cap 70 to the lock pin 66, the pin biasing member 72 biases the lock pin 66 towards an extended position, as shown in FIG. 5B. Specifically, as the pin biasing member 72 is compressed between the annular collar 84 formed on the locking pin 66 and the annular biasing member shoulder 108 formed in the pin casing 68, a biasing force biases the pin biasing member 72 in the direction of arrow B2, as shown in FIG. 5A.

In order to facilitate a better understanding of the present disclosure, operation of the captive bolt tool system will now be explained. With reference to FIG. 1, the captive bolt tool system 10 is in an overall safe position in which the activator 50 is in the safe position, the bolt 20 is in the retracted position, and the lock pin 66 of the automatic lock mechanism 64 is in the disengaged position. In the overall safe position, the captive bolt tool 10 is prevented from moving the bolt 20 from the retracted position to the extended position upon actuation of the trigger 18. In the safe position, a combustion chamber is open to the atmosphere. No fuel is released from the fuel canister. A lockout switch of the electrical system confirms the position of the activator and disarms the trigger electrically such that the spark plug is dead. Therefore, firing is prevented.

In order to configure the captive bolt tool system 10 from the overall safe position into the overall fire position, the activator 50 is moved in the direction of arrow A1 from the safe position towards the fire position, as shown in FIG. 1. The movement of the activator 50 from the safe position to the fire position may be performed by contacting an end of the activator 50 upon a work surface and depressing the main body 12 of the captive bolt tool system 10 in the direction of arrow A2. Upon the depression force of the main body 12 overcoming the biasing force of the biasing member 62, the activator 50 moves from the safe position to the fire position, as shown in FIG. 3.

The movement of the activator 50 from the safe position to the fire position allows the lock pin 66 of the automatic lock mechanism 64 to automatically move from a disengaged position to an engaged position, as shown in FIG. 3. In the fire position, the movement of the activator 50 compresses the biasing member 62, which exerts a biasing force in the direction of arrow B1 to move the activator 50 from the fire position to the safe position upon the movement of activator 50 out of contact with the work surface and the cease of the depression force on the captive bolt tool system 10 in the direction of arrow A2. It is the movement of the lock pin 66 of the automatic lock mechanism 64 from the disengaged position to the engaged position that retains the activator 50 in the fire position after the cease of the depression force on the captive bolt tool system 10 in the direction of arrow A2.

With reference to FIGS. 5A and 5B, the automatic movement of the automatic lock mechanism 64 will be discussed in greater detail. As shown in FIG. 5A, the lock pin 66 of the automatic lock mechanism 64 is in the disengaged position. In the disengaged position, the insertion end 76 of the lock pin 66 is in contact with the outer surface 116 of the receiver portion 28. Specifically, a tapered point 122 of the insertion end contacts the outer surface 116 of the receiver portion 28. The pin biasing member 72 is compressed and applies a biasing force in the direction of arrow B2 to move the lock pin 66 in the direction of arrow B2. However, the contact between the lock pin 66 and the outer surface 116 of the receiver portion 28 prevents movement of the lock pin 66 from the disengaged position to the engaged position.

The cap 70 is spaced apart from the open cap end 98 of the pin casing 68. The displacement of the lock pin 66 towards the open cap end 98 is limited by the contact between the stopper 82 and the stopper shoulder 106.

Upon movement of the activator 50 from the safe position to the fire position in the direction of arrow A1, the tapered point 122 of the lock pin 66 slides along the outer surface 116 of the receiver portion 28 of the bolt guide 22. Once the activator 50 is positioned in the fire position, the aperture 114 is aligned with the recess 32 of the stem portion 26 formed between the receiver shoulder 34 and the flange shoulder 36. The alignment of the aperture 114 with the recess 32 ceases the contact between the tapered point 122 of the insertion end 76 and the outer surface 116 of the receiver portion 28. As the lock pin 66 is no longer constrained by the receiver portion 28, the biasing force of the pin biasing member 72 automatically biases the lock pin 66 in the direction of arrow B2 into the engaged position, as shown in FIG. 5B.

With reference to FIG. 5B, the lock pin 66 extends into the activator 50 through the aperture 114 and enters the recess 32, providing the lock pin 66 in the engaged position. In the engaged position, the displacement of the lock pin 66 towards the open activator end 96 is limited by the contact between the cap 70 and the open cap end 98 of the pin casing 68.

As the activator 50 is biased in the direction of arrow B1 by the biasing force of the biasing member 62, an exterior surface 124 of the lock pin 66, adjacent the insertion end 76, is biased against the receiver shoulder 34. As the lock pin 66 is biased in the direction of arrow B2 by the biasing force of the pin biasing member 72, the lock pin 66 is biased to the engaged position extending into the recess 32. Therefore, contact of the exterior surface 124 of the lock pin 66 against the receiver shoulder 34 retains the activator 50 in the fire position against the biasing force of the biasing member 62 even upon cease of the depression force of the main body 12 in the direction of arrow A1.

As shown in FIG. 3, the captive bolt tool system 10 is in an overall fire position in which actuation of the trigger 18 actuates the actuation mechanism 46 to move the bolt 20 from the retracted position, as shown in FIG. 3, to the extended position, as shown in FIG. 4.

Upon movement of the bolt 20 from the retracted position to the extended position, contact of the exterior surface 124 of the lock pin 66 against the receiver shoulder 34 is retained to prevent the activator 50 from moving from the fire position, as shown in FIG. 4, to the safe position.

In order to release the activator 50 from the fire position, the lock pin 66 is moved in the direction of arrow A3, as shown in FIGS. 4 and 5B, in order to overcome the biasing force of the pin biasing member 72 to slide the lock pin 66 within the tiered passage 94 so as to move the lock pin 66 from the engaged position to the disengaged position. Upon movement of the lock pin 66 from the engaged position to the disengaged position, the lock pin 66 no longer contacts the receiver shoulder 34 of the receiver portion 28, and the biasing force of the biasing member 62 biases the activator 50 from the fire position to the safe position. As such, movement of the lock pin 66 from the engaged position to the disengaged position automatically moves the activator 50 from the fire position to the safe position.

In some embodiments, the bolt 20 is provided to have a length that is greater than a length of bolt tool systems without the automatic lock mechanism 64.

It will be clear to those of skill in the art, the herein described embodiments of the present disclosure may be altered in various ways without departing from the scope or teaching to the present disclosure. It is the following claims, including all equivalents, which define the scope of the present disclosure.

The invention claimed is:

1. A bolt tool system, comprising:
a tool housing;
a bolt guide attached to the tool housing;
a bolt moveably received within the bolt guide for movement between a retracted position and an extended position;
an activator moveably received on the bolt guide for movement between a safe position and a fire position, in the fire position the bolt being moveable from the retracted position to the extended position; and
an automatic lock mechanism operable to retain the activator in the fire position.

2. The bolt tool system of claim 1, wherein the automatic lock mechanism comprises:
a pin casing secured to the activator, the pin casing having a passage; and
a lock pin slidably received within the passage of the pin casing, the lock pin moveable between a disengaged position and a engaged position in which the lock pin retains the activator in the fire position.

3. The bolt tool system of claim 2, wherein the activator has an aperture defined therein, the pin casing passage being in communication with the aperture defined in the activator.

4. The bolt tool system of claim 3, wherein in the engaged position, the lock pin extends through the aperture formed in the activator.

5. The bolt tool system of claim 2, further comprising a biasing member that biases the activator towards the safe position, the lock pin retaining the activator in the fire position against a biasing force of the biasing member when the lock pin is in the engaged position.

6. The bolt tool system of claim 2, wherein the bolt guide includes a recess, and in the engaged position the lock pin enters the recess to retain the activator in the fire position.

7. The bolt tool system of claim 2, further comprising a pin biasing member disposed within the pin casing, the pin biasing member biases the lock pin towards the engaged position.

8. The bolt tool system of claim 7, wherein the passage includes a pin passage adjacent the first end, a cap passage adjacent the second end, and a biasing member passage defined between the pin passage and the cap passage, the pin biasing member being disposed within the biasing member passage.

9. The bolt tool system of claim 2, further comprising a cap secured to the lock pin, and wherein when the lock pin is in the disengaged position the cap is spaced apart from a second end of the pin casing.

10. The bolt tool system of claim 1, wherein the bolt guide includes a flange portion at one end, a receiver portion at an opposite end, and a hollow stem portion that connects the flange portion to the receiver portion, the flange portion being secured to the tool housing, the receiver portion having a generally cylindrical shape with a receiver shoulder positioned between an outer surface of the receiver portion and the hollow stem, and the stem portion defining a recess between the flange portion and the receiver portion.

11. The bolt tool system of claim 10, wherein:
the automatic lock mechanism comprises:
a pin casing secured to the activator, the pin casing having a passage; and
a lock pin slidably received within the passage of the pin casing, the lock pin moveable between a disengaged position and a engaged position in which the lock pin retains the activator in the fire position; and
the lock pin extending into the recess of the bolt guide in the engaged position.

12. The bolt tool system of claim 11, wherein:
when the activator is in the safe position the receiver portion of the bolt guide is positioned adjacent the lock pin such that the lock pin is blocked from entering the recess; and
wherein upon movement of the activator from the safe position to the fire position the lock pin aligns with the recess and the lock pin is movable into the engaged position and extends into the recess.

13. The bolt tool system of claim 1, wherein the bolt is a captive bolt.

14. A bolt tool system comprising:
a tool housing;
a bolt guide attached to the tool housing;
a bolt moveably received within the bolt guide for movement between a retracted position and an extended position;
an activator moveably received on the bolt guide for movement between a safe position and a fire position, the activator having an aperture, in the fire position the bolt being moveable from the retracted position to the extended position;

a pin casing secured to the activator, the pin casing having a passage in communication with the aperture formed in the activator; and a lock pin slidably received within the passage of the pin casing, the lock pin moveable between a disengaged position and a engaged position in which the lock pin retains the activator in the fire position.

15. The bolt tool system of claim 14, further comprising a biasing member biasing the activator towards the safe position, the lock pin retaining the activator in the fire position against a biasing force of the biasing member.

16. A bolt tool system comprising:

a tool housing;

a hollow bolt guide having a receiver portion at one end, a flange portion at an opposite end, and a stem portion between the receiver portion and the flange portion, the flange portion secured to the tool housing;

a bolt moveably received within the bolt guide for movement between a retracted position and an extended position;

an activator moveably received on the bolt guide for movement between a safe position and a fire position, the activator having an aperture, in the fire position the bolt being moveable from the retracted position to the extended position;

a biasing member positioned between the activator and the flange portion of the bolt guide, the biasing member biasing the activator towards the safe position;

a pin casing secured to the activator, the pin casing having a passage in communication with the aperture formed in the activator;

a lock pin slidably received within the passage of the pin casing for movement between a disengaged position and an engaged position; and a pin biasing member providing in the passage of the pin casing, the pin biasing member biasing the lock pin towards the engaged position;

wherein in the engaged position the lock pin retains the activator in the fire position against a biasing force of the biasing member.

17. The tool system of claim 16, wherein a recess is formed in the stem portion between the flange portion and the receiver portion, and in the engaged position the lock pin extends through the aperture formed in the activator and enters the recess to retain the activator in the fire position.

18. The tool system of claim 17, wherein in the disengaged position the lock pin contacts an outer surface of the receiver portion of the bolt guide.

19. The tool system of claim 18, wherein in the engaged position an exterior surface of the lock pin abuts against a receiver shoulder of the receiver portion, the receiver shoulder formed between the outer surface of the receiver portion and the stem portion.

20. The tool system of claim 19, wherein when the activator is in the fire position and the lock pin is in the engaged position, the biasing member biases the exterior surface of the lock pin against the receiver shoulder to retain the activator in the fire position.

* * * * *